United States Patent [19]

Monlux

[11] Patent Number: 5,098,481
[45] Date of Patent: Mar. 24, 1992

[54] SOIL REMEDIATION PROCESS AND SYSTEM

[75] Inventor: Kenneth J. Monlux, San Jose, Calif.

[73] Assignee: Reed & Graham, Inc., San Jose, Calif.

[21] Appl. No.: 665,427

[22] Filed: Mar. 6, 1991

Related U.S. Application Data

[63] Continuation-in-part of Ser. No. 490,091, Mar. 6, 1990.

[51] Int. Cl.$^5$ ............................................. B08B 7/00
[52] U.S. Cl. ..................................... 134/19; 201/25; 202/99; 202/129; 202/215; 422/184; 422/232; 208/407; 208/427
[58] Field of Search ............... 184/19; 201/25; 202/99, 202/129, 215; 422/184, 232; 208/407, 427

[56] References Cited

U.S. PATENT DOCUMENTS

| | | | |
|---|---|---|---|
| Re. 32,206 | 7/1986 | Bracegirdle | 366/7 |
| 4,133,741 | 1/1979 | Weichman | 110/346 |
| 4,170,551 | 10/1979 | Honour | 210/27 |
| 4,245,915 | 1/1981 | Bracegirdle | 366/10 |
| 4,378,162 | 3/1983 | Bracegirdle | 366/7 |
| 4,424,081 | 1/1984 | Giguere | 134/10 |
| 4,447,332 | 5/1984 | Crisman et al. | 210/748 |
| 4,469,557 | 9/1984 | Schweer et al. | 201/25 |
| 4,515,684 | 5/1985 | Brown | 208/180 |
| 4,581,130 | 4/1986 | Globus | 134/10 |
| 4,585,543 | 4/1986 | Duncan | 208/407 |
| 4,659,456 | 4/1987 | Rammler | 208/407 |
| 4,738,206 | 4/1988 | Noland | 110/346 |
| 4,745,850 | 5/1988 | Bastian | 98/56 |
| 4,784,216 | 11/1988 | Bracegirdle et al. | 165/64 |
| 4,787,452 | 11/1988 | Jennings, Jr. | 166/272 |
| 4,828,030 | 5/1989 | Jennings, Jr. | 166/271 |
| 4,841,998 | 6/1989 | Bruya | 134/10 |
| 4,882,021 | 11/1989 | Barnhart | 422/184 |
| 4,985,131 | 1/1991 | Lane | 201/25 |

OTHER PUBLICATIONS

Heat Recovery Facts by Paul E. Bracegirdle, CMI Corp. brochure CMI-2014 (6-89), copyright 1989.
Reprint from the Weston Way, Application of Thermal Technologies for Decontaminating Soil, Spring 1989, pp. 1-5.

*Primary Examiner*—Asok Pal
*Attorney, Agent, or Firm*—Jacques M. Dulin

[57] ABSTRACT

Process and apparatus for near-zero discharge soil remediation, preferably in conjunction with an asphalt plant, comprising heating soil contaminated with up to about 30,000 ppm light hydrocarbons in an inclined, axially-fired rotating separator, and sampling the output soil to determine the remaining contaminants. If below 100 ppm (preferably 10 ppm) it may be reemplaced as clean fill. If it does meet D.O.T./CALTRANS standards and is below about 100 ppm it may be used as roadbed fill. If between about 1000 and 100 ppm and meets standards it may be used as aggregate, being mixed with hot oil to form asphalt. The separator offgases are condensed, the reclaimed liquid hydrocarbons separated and combined with the hot oil. The hot condenser offgases are supplied as secondary air to a main dryer, improving efficiency of operation. A dust/mud blow down system clears the heat exchange plenums with compressed air.

20 Claims, 3 Drawing Sheets

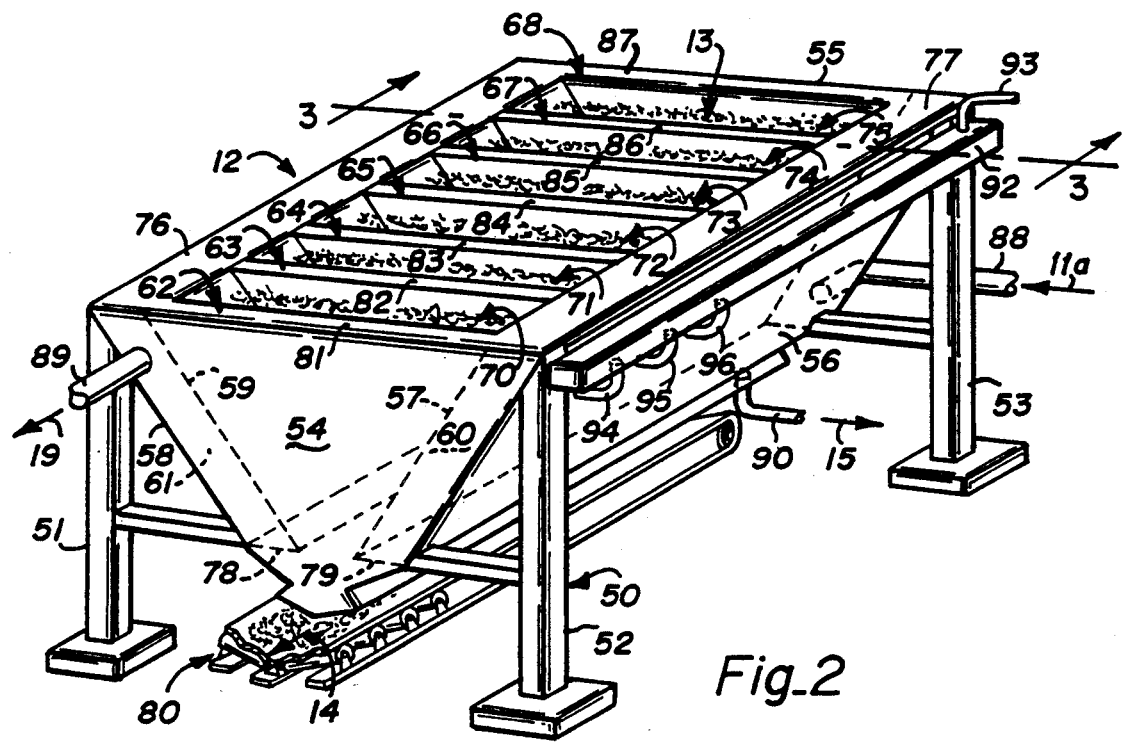
Fig_2
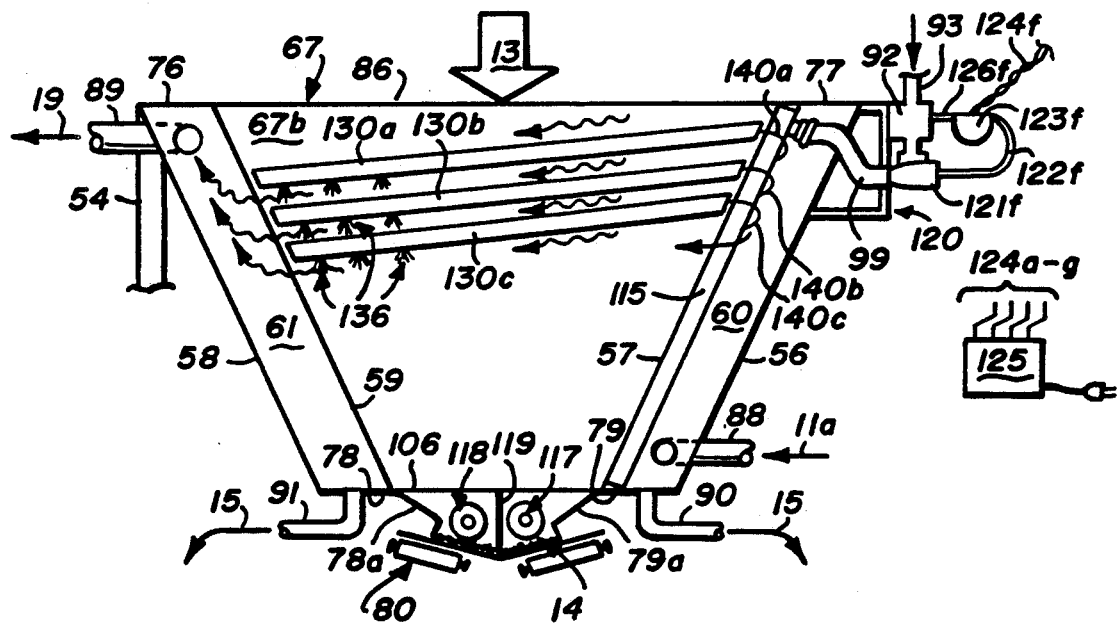
Fig_3

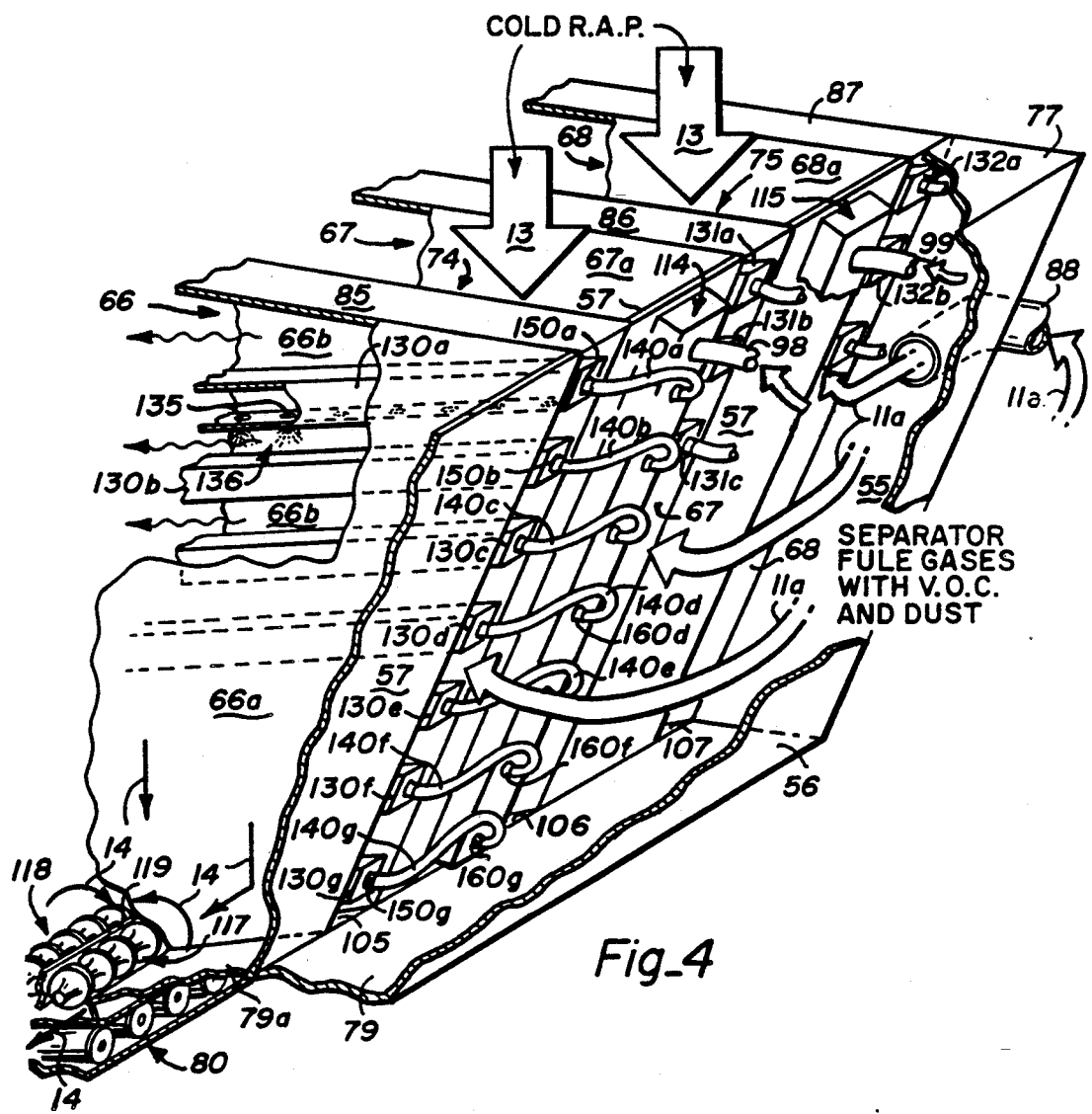
Fig_4

SOIL REMEDIATION PROCESS AND SYSTEM

CROSS REFERENCE TO RELATED APPLICATIONS

This is a Continuation-in-Part of U.S. Ser. No. 490,091 filed March 6, 1990, the benefit of the filing date of which is claimed under 36 USC §120.

FIELD

This invention pertains to pollution control, and more particularly to a near-zero discharge process of soil remediation in which soil which has been contaminated by hydrocarbons such as spills of gasoline, kerosene, diesel fuel, aircraft fuel, oil, grease and the like is treated to remove the hydrocarbons. The remediated soil is either returned to a fill site as clean remediated soil, or (depending on the soil type) is used as road bed fill or as an aggregate filler for high grade asphalt or road paving. The off gasses are condensed, and the condensate water/hydrocarbons are separated with the hydrocarbons being supplied to the asphalt batch tower. The process is particularly applicable to integrated asphalt production facilities.

BACKGROUND

There are an enormous number and volumetric quantity of natural and man-caused hydrocarbon contaminations of soil. The most common of these are accidental or deliberate spills of gasoline, oils and greases, kerosene, diesel fuels and aircraft fuels. These sites range from oil field operations to aircraft refueling sites, gas stations and grease dumps. There are also natural oil seeps, and earthquake, construction or slide-induced ruptures of gas and oil lines.

The problem is enormous: For example, in the State of California alone there are some 12,000 sites involving 63 million tons of soil that needs to be remediated. The problem is severe as the transfer of real estate in excess of $50,000 requires a soil survey in order to determine the nature, extent and degree of hydrocarbon contamination. If there is any contamination, then the law mandates that the soil be remediated.

The current state of the art is not to remediate raw, contaminated soil, but rather simply to encapsulate it without pretreatment in some other material as a component, such as a component of asphalt. Other uses have been proposed, such as encapsulating in concrete, soilcrete and the like. However, the quantity of soil involved and the current state of encapsulation techniques yields only low grade, light duty mixes. For example, asphalt-encapsulated non-pretreated soil is low grade and may only be used for parking lots and driveways. It cannot be used as high grade asphalt for roads, runways or heavy traffic access ways.

The patent literature shows a variety of approaches to reconditioning soils contaminated by crude oil or other refined petroleum products. Broadly these involve indirect thermal treatment, aeration, bioremediation involving microbial action, and chemical treatment. For example, Noland U.S. Pat. No. 4,738,206 seals soil in a stripping conveyor against contact with air (low $O_2$ content), and indirectly heats the soil in the conveyor by contact with hollow screw flights heated by hot transfer fluid. The hot transfer fluid may be hot oil heated externally of the conveyor by a fuel fired heater. The exhaust gases of the heater are non-oxidizing and fed into the conveyor countercurrent to the soil feed. The conveyor is heated to between 120°–450° F., with 140–220° F. being preferred. The hot gases exhausting the conveyor are first passed through a baghouse, then to a condenser apparently without heat recovery, and then a gas/liquid separator. The gases then go to an afterburner where they are incinerated.

Giguere U.S. Pat. No. 4,424,081 involves an aqueous system of mixing and heating the contaminated soil to form a blended slurry. A sparger kiln agitates the aqueous slurry to break down the component parts into a fine particle slurry. The fine particle slurry is then washed in a clarifier, and further washing is done with aid of reagents in flotation cells which also separate oil from the fine soil particles. An aeration clarifier separates oil from the liquid mixture removed from the flotation cells.

Honour U.S. Pat. No. 4,170,551 burns waste oil on board ship in the ship's steam boiler. Jennings U.S. Pat. Nos. 4,828,030 and 4,787,452 dispose of fines produced with high viscosity oil by mixing with hydraulic fracturing fluid or steam, which mixture is used a fracing fluid.

Bastian et al in U.S. Pat. No. 4,745,850 employs aeration in Situ et al by providing a series of vertical boreholes and horizontal conduits connecting the boreholes to provide an airpath. Suction is provided by a conventional wind turbine.

Brown U.S. Pat. No. 4,515,684 reclaims oil from emulsified mixtures of oil, water and particulate solids by using one or more special settler(s) having an internal mixing centerwell and means for heating or cooling therein, and employing chemical demulsifying agents. Bruya U.S. Pat. No. 4,841,998 employs an aqueous ammonia solution in a soil agitator and settling tanks to treat soil having organic hazardous wastes. The contaminants best treated by this method are polynuclear aromatic hydrocarbons, other non-polar organic wastes, and petroleum products.

Globus U.S. Pat. No. 4,581,130 treats chlorinated hydrocarbons, including PCBs by dispersing sodium metal in oil, reacting with copper and lead to form a ternary alloy of Na/Cu/Pb, contacting the halogenated hydrocarbon with the alloy, and recovering sodium chloride, excess alloy and Cu/Pb from the now halogen-free material. Crisman et al U.S. Pat. No. 4,447,332 separates volatile liquid hydrocarbons and/or water from fuel sludge by filtration and exposure to UV radiation (light) to detoxify lead-containing fuel storage tank sludge.

Various asphalt processes and equipment used in asphalt plants are shown in Bracegirdle et al Patent Nos. 4,784,216; 4,245,915; 4,378,162 and Re 32,206. None are directed to soil remediation. 4,784,216 shows a R.A.P. heater which may be used as one element, a condenser/heat exchanger, of the system of the present invention. 4,245,918, 4,378,162 and Re 32,206 show various aspects of making asphalt in a sealed, indirectly heated mixing chamber.

Various patents show use of heat to recover hydrocarbons from oil shale, tar sands and coal, typically at very high temperatures, some of which include cracking. For example, Weichman, U.S. Pat. No. 4,133,741 recovers shale oil hydrocarbons from oil shale in a continuous, straight or circular horizontal moving bed retort of cross-flow design to prevent condensation and revaporization present in the usual oil shale vertical furnace retorts. The Weichman process uses neutral or reducing gas at temperatures of 800°-1100° F. in a down flow direction through the bed of crushed oil shale rock. No examples are shown in this theoretical patent, and no outlet spent shale hydrocarbon content is disclosed. Duncan U.S. Pat. No. 4,585,543 recovers hydrocarbons from oil shale, coal or tar sands by thermal regenerative cracking in a vertical reactor at a temperature on the order of 1400 with residence time of 0.005-2 sec. The solids go to a stripper and thence to a gasifier. Rammler U.S. Pat. No. 4,659,456 directly contacts tar sands, oil sands and diatomite with superheated steam at 200°-750° C., with the remaining solids going to dry distillation at 400°-600° C. by mixing with a fine grained heat transfer medium. The residue may contain residual hydrocarbons.

None of these three oil shale/tar sands patents are directed to the same problem of soil remediation, with near zero discharge, and their process conditions and outputs are vastly different, as the spoil pile residues from oil shale and tar sands processing are usually above 3% hydrocarbons, i.e. are still very contaminated with hydrocarbons.

Accordingly, there is an immediate and significant need for a process which remediates soil contaminated by these types of hydrocarbons to yield a variety of remediated products, some suitable for safe reemplacement, others for roadbed fill, and still others as a component of high grade asphalt.

THE INVENTION

Objects

It is an object of this invention to provide a method for remediating hydrocarbon-contaminated soil of a wide variety of types.

It is another object of this invention to provide a process for hydrocarbon-contaminated soil remediation wherein the resulting remediated soil may be put to a variety of uses, including reemplacement, use as roadbed fill or as a component in high grade asphalt.

It is another object of this invention to provide an integrated asphalt producing process which simultaneously remediates hydrocarbon-contaminated soil as an aggregate filler of the asphalt.

It is another object of this invention to provide a hydrocarboncontaminated soil remediation process which is essentially near-zero discharge.

It is another object of this invention to provide a process for an integrated asphalt production facility in which off-gasses from soil remediation treatment facilities is used to pre-heat R.A.P. or other aggregate, and the hydrocarbon condensate from this heat exchange is introduced into the asphalt concrete or batch tower without degrading the properties thereof.

It is another object of this invention to provide an integrated asphalt production facility in which off-gasses from rap heat exchange units is used as secondary air for the main dryer burner.

It is another object of this invention to provide an improved heat transfer/condenser unit having pulsed compressed air cleaning means for keeping "mud" from plugging the unit.

It is another object of this invention to provide a method of preventing plugging of a heat transfer/condenser unit by compressed air purging of ultra fine dust produced in the separator during the soil remediation in accord with the process of this invention.

Still other objects will be evident from the specification, drawings and claims.

Drawings

The invention is illustrated in the drawings, in which:

FIG. 2 is a perspective view of the condenser/heat exchanger unit of this invention;

FIG. 3 is an elevation view of the condenser/heat exchanger along line 3—3 of FIG. 2 with a heat exchange panel removed to show the blow tubing and manifold system; and FIG. 4 is a partial perspective showing the internal manifolding feeding the mud blow tubes.

SUMMARY

Figure 1:
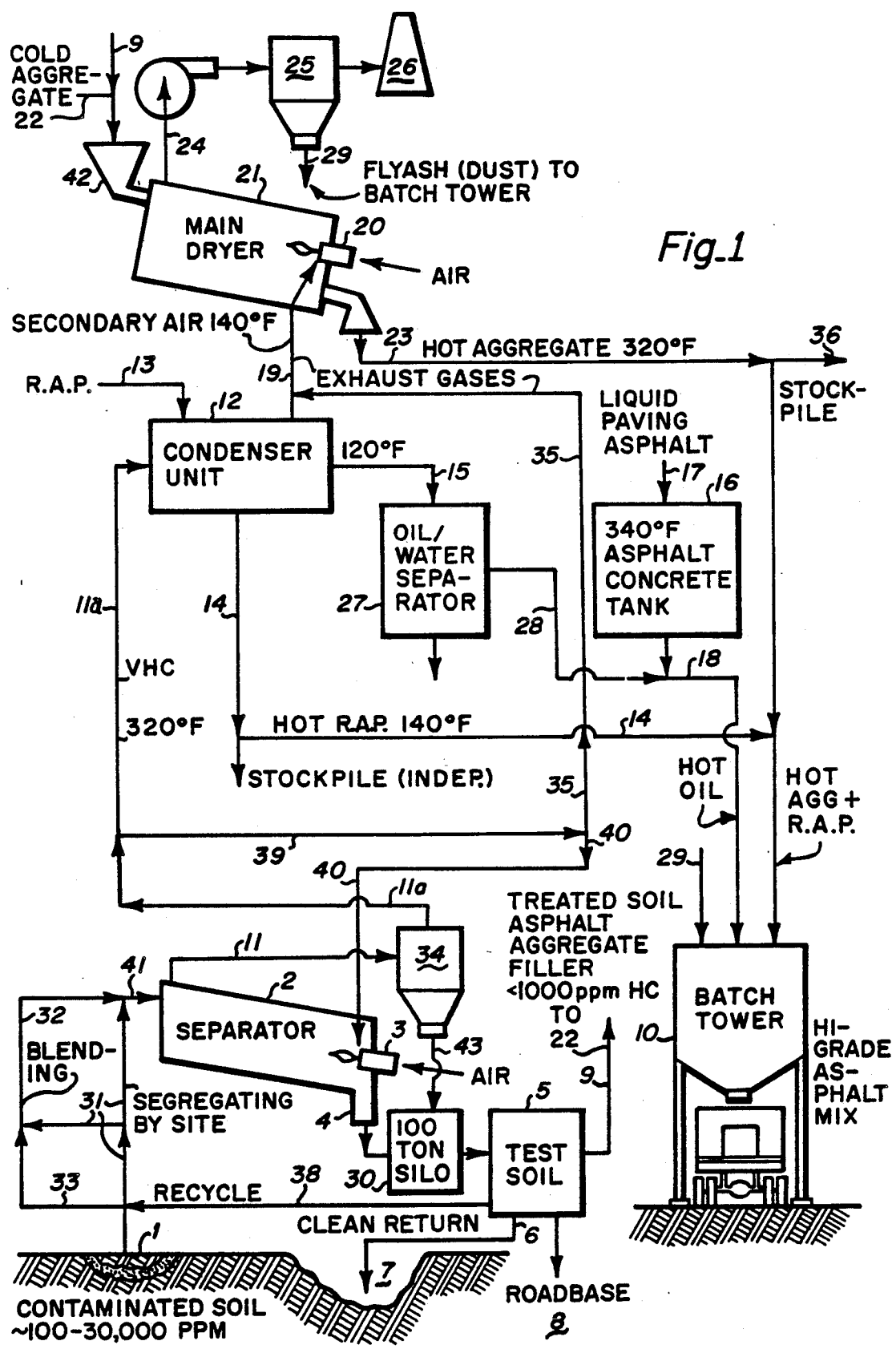
FIG. 1 is a schematic of the process flow sheet of this invention.

The invention relates to a pollution control process and apparatus for remediation of hydrocarbon-contaminated soil from a wide variety of sources, principally from fuel spills. Hydrocarbon contaminated soil of size on the order of −1 ½" and having on the order of less than 30,000 ppm hydrocarbon contaminants is heated in an inclined rotary separator having an internal axial burner in an oxidizing (slightly oxidizing) atmosphere to a temperature in the range of from about 375° F. to about 750° F., preferably 600°-700° F., for a time period sufficient (including recycle for multiple passes through the separator) to drive off volatile hydrocarbons from the soil to near zero level. Throughput is typically 10-70 Tons Per Hour, preferably 15-50 TPH. The soil to be remediated may be preprepared by blending, segregation by site, sized and the like in accord with standard materials handling techniques.

The remediated soil is tested for remaining contaminants. If less than 100 ppm, depending on soil type it may be used either for roadbed fill or as asphalt aggregate filler. In the latter case it is passed to the main dryer of an asphalt manufacturing plant and thence to the batch tower. The hot (typically 225°-320° F.) off-gases from the separator containing the volatilized hydrocarbons (VHCs) are then passed through a special condenser unit where the heat is extracted and exchanged with R.A.P. input at ambient temperature. The hot R.A.P. (typically 100°-140° F.) exiting the condenser/heat exchanger is then combined with hot aggregate (including remediated soil), typically at 320° F., exiting the main dryer and is transferred to the batch tower. The condensate is a water/hydrocarbon mixture which is then piped into an oil/water separator. The separated hydrocarbon (and some or all of the water), at about 125° F., is then mixed in an asphaltic emulsion mill with hot (typically 340° F.) liquid paving asphalt from the asphalt concrete tank, and introduced into the batch tower.

The hot (typically 100°-160° F.) off-gases from the condenser unit are aspirated into the secondary air of the main dryer burner(s) (typically an internal axial burner) for a more efficient burn. The main dryer burner performance/energy efficiency improves about 5-10% from around 85% to about 90-95% due to better air:fuel ratio, hotter input secondary air and more efficient burn. Cold (ambient temperature) aggregate (including any suitable type of remediated soil exiting the separator) is then heated in the main dryer, typically at about 600° F. internal temperature, for a time sufficient to heat the combined aggregate stream to about 320° F. The hot aggregate is combined with hot R.A.P. and forwarded to the batch tower to where it is combined (mixed) with hot oil in a conventional manner, and the resulting asphalt mix is used.

While typical temperatures have been given here, it is to be understood that all the temperatures fall within ranges depending on operating conditions, the mass and through put the intended product type and use and the like.

Preferably, the separator employed is on the order of 30' long, 6' diameter, rotating at a rate in the range from about 0-25 rpm, preferably 3-15 rpm. It functions as a counter-flow drier with the contaminated soil introduced at the elevated end with an axially aligned, open flame, multi-fuel burner on the order of 250,000 BTU/hr at the exit end. It includes a series of internal lifters to provide a veil of falling soil for good heat transfer.

If the in-place soil assays over 100 ppm hydrocarbons, by law action must be taken, and after May 8, 1990 it must be remediated by a plant having an appropriate treatment permit. The typical contaminated soil is in the range of 200-5000 ppm of light lube oils, diesel, kerosene, jet fuels and gasoline, although up to about 30,000 ppm or more hydrocarbons may be remediated by the process of this invention.

By "R.A.P." is meant Recycled Asphalt Products, the preferred being reclaimed asphalt. However, any aggregate product that is used as asphalt matrix may be passed through the condenser/heat exchanger unit. It can include $-\frac{1}{4}''$ aggregate or cold remediated soil from a storage pile before being introduced in the main dryer. Typical R.A.P. or aggregate is cold and wet ($>5\%$ moisture) from a stockpile. The hot R.A.P. out of the condenser/heat exchanger unit is typically in the range of 100°-180° F., and usually 100°-140° F.

It should be understood that the separator and condenser units in combination may be run independently of the asphalt plant with the separated hydrocarbon and remediated soil being stockpiled. For example, the main dryer can be run empty at low fire, as during start-up (with the condenser exhaust gas being used as secondary air at low fire). The oil/water separator may be any conventional gravity separator.

The main dryer is typically a 54' long, 12' diameter dryer inclined at 2-3 with an axial burner at the low end. Preferably the main dryer has lifts and the exhaust gas is around 300° F.±25° F. The main dryer maximum temperature is on the order of 600° F. with the hot aggregate out at about 300°-330° F.

Regarding the remediated soil, any soil treated by the process of this invention having a remediated HC value below about 1000 ppm may be employed as aggregate filler in the batch tank if it is the appropriate type. For roadbase, the values are generally <100 ppm and preferably about 10 ppm. A convenient determination test for whether the remediated soil is used for roadbase or aggregate filler, is if it does not meet CALTRANS or D.O.T. (Department of Transportation) minimum standards of 78R (stability) value, sand equivalent in excess of 30, and a durability (hardness) above 50, it is used as roadbase. If above those values and the type is correct (ok D.O.T. or CALTRANS), it may be used as asphalt aggregate filler. Remediated soil having less than 100 ppm, regardless of type may be returned to place of origin as clean remediated soil, or used elsewhere as clean fill.

Test runs show that soils having from 10,000– ppm total Hydrocarbons (herein HC) to 25,000 ppm diesel fuel #2 could be processed in a single pass through the separator in accord with the method of this invention reducing the total hydrocarbons to a nondetectable level in less than about 15 minutes.

The condenser/heat exchanger unit of this invention is prevented from plugging up with ultra fine "mud" produced in the separator by provision of special blow pipes which are periodically pulsed with compressed air to blow the accumulated dust into the main dryer unit with the cooled and condensed separator gases.

As an alternative to the process shown in the Figure, a conventional drum dryer may be used in place of the batch tower. The drum dryer may be of co-current or countercurrent construction.

DETAILED DESCRIPTION OF THE BEST MODE

The following detailed description illustrates the invention by way of example, not by way of limitation of the principles of the invention. This description will clearly enable one skilled in the art to make and use the invention, and describes several embodiments, adaptations, variations, alternatives and uses of the invention, including what I presently believe is the best mode of carrying out the invention.

FIG. 1 describes a typical example of the soil remediation system and process of this invention Contaminated soil 1 having up to about 30,000 ppm of hydrocarbons, and preferably 200-5000 ppm, is excavated from a site determined to be contaminated by appropriate tests and transferred to the separator unit 2. Alternately, the separator unit 2 may be portable and brought to the site, e.g. by truck or rail, in the latter case preferably as permanently mounted on a flatbed railcar. The separator in this example is a 30' long by 6' diameter, counterflow declined-to-burner unit of mild steel, internally fitted with lifters and wear plates, mounted on trunnions for variable speed rotation (0-15 rpm) by a 50-75 hp electric motor. The center-axis burner is a multi-fuel burner 3, e.g. propane, natural gas (preferred) or diesel fuel fired, with 100% primary air and a 100% turndown ratio. With a 15-40 TPH throughput of $-1\frac{1}{2}''$ to $+200$ Tyler mesh contaminated soil, the temperature range internal of the separator may be controlled in the range of about 375°-750° F., preferably 600°-700° F. While conditions are slightly oxidizing, the temperature of the soil in the separator is kept below ignition.

The remediated soil 4 (soil from which the hydrocarbons have been separated by heat) may be transferred to a holding silo, e.g. a 100 ton silo 30. The soil is then tested (shown schematically as block 5) to determine the residual petroleum-based hydrocarbon content. The remediated soil is tested for soil type. If it fails CALTRANS and/or D.O.T. specs, and the hydrocarbon content is below about 100 ppm, it may be used as roadbase fill 8. If it is below 100 ppm regardless of type, and preferably below 10 ppm, it may be returned and reemplaced as clean return 7. If it passes CALTRANS or D.O.T. specs and is up to about 1000 ppm HC it may be used as aggregate filler 9 for asphalt. If the hydrocarbon content is deemed too high, it may be recycled via line 38 back into the drier for a second or multiple passes, but in the typical case one pass is sufficient to reduce HC to non-detectable.

It should be understood that the contaminated soil 1 may be segregated 31 by site if required, or blended 32 with other original contaminated soil, or with recycled soil 33, before input into the upper, inlet end 41 of separator 2. Likewise the remediated soil 4 may be blended or segregated by site before or after testing, or may be recycled 38 a number of times to reduce contaminants to a desired level. Where the remediated soil is of the proper type and below about 1000 ppm, it is transferred (see line 9) to the main dryer inlet hopper 42, either directly or after intermediate storage and/or blending.

Dust and fines above about 300 mesh exhausting from the separator 2 via line 11 are retained in knock-out box 34, and the exhaust gases, typically 5000 ACFM at 240° (200° F.-400° F. range) for 18-40 TPH throughput, are ducted via an uninsulated 2' duct 11a to the condenser/heat exchanger unit 12, described in more detail below. The knock-out box 34 may be a cyclone or a multiclone (a plurality of small cyclones in a single knock-out box). The fines 43 are passed to the 100 ton silo 30, being remediated soil.

Ambient cold R.A.P. (50°-65° F.), or other aggregate filler 13, is passed through the condenser unit 12 counterflow, or preferably crossflow, to the hot separator off gas 11a. The gas does not contact the R.A.P. and the $\Delta P$ is about 1" w.c. It is preferred to use a modified CMI Corp. (Oklahoma City, OK) model HRB 135 Heat Recovery Bin type separator/heat exchanger. The modifications, to prevent ultra fine mud plugging, are described in detail below. Alternately, where humidity in separator flue gas is low a baghouse upstream of the condenser 12 may be employed to remove fines and transfer them to main dryer 21.

In the condenser unit 12, approximately ½ the $H_2O$ drops out. For example, for a 6% contaminated soil moisture content, and the separator burning natural gas at 50% excess air at 40% relative humidity, off-gas 11a inlet to the condenser at 240° F. and the condensate 15 outlet at 125° F., 200 lb./moles/hr. inlet off-gases 11a will have 90 lb./moles/hr. water condensed out in line 15, a 53% efficiency. This is about 2 gal./min. water/oil condensate recovered in line 15 for 20 TPH throughput in separator 2 of contaminated soil having a 5000 ppm diesel contaminate reduced to below 10 ppm in one pass through separator 2.

The 2 gpm o/w condensate is processed in separator 27 producing 0.4-0.5 gpm hydrocarbons which are combined via line 28 with liquid paving asphalt 17 which has been heated, as conventional, to 325°-350° F. in asphalt concrete tank 16 and transferred via line 18 to the batch tower 10 as needed. The recovered liquid hydrocarbons in line 28 can be held in a holding tank (not shown) until required. For the separator 27 a standard 2-stage gravity separator, such as made by McTighe Industries, Inc., Low Flow Model 350-550 or smaller, can be used.

Alternately, the oil/water condensate can be used in an asphalt emulsion mill (not shown) and the emulsion used directly or input to the batch tower.

Continuing with the same example, the exhaust gas 19 out of the condenser 12 will be about 140° F. at 3850 ACFM (range of from about 3500-4500 ACFM), and is ducted to burner 20 of main dryer 21 as secondary air. Alternately, some of the separator exhaust gas 11a can be used as secondary (aspirated) air to separator burner 3 via ducts 39, 40, or routed directly to main dryer via ducts 35, 19 where no condensation is needed or desired, e.g. for very low HC contamination in the soil or on start-up. Conversely, some of the condenser off gases 19 may be used as secondary air in separator burner 3 via lines 19, 35 and 40.

The main dryer is a 54' long × 12' diameter standard inclined aggregate dryer employing a blower-pressurized burner on the order of 250,000 BTU/hr. at 63,000 ACFM (primary plus secondary air at 150% excess air). Thus, the hot condenser off gases from line 19, at 3500-4500 ACFM are well within the range of allowable secondary burner air for this main burner 20. Use in this manner of the condenser off-gases significantly improves the energy efficiency of the main dryer burner, as above described.

Cold aggregate 22 is introduced at the upper end of main dryer 21 via inlet hopper 42. This aggregate is typically crushed gravel, sand and remediated soil from line 9. The main dryer is sized at 350 TPH, including the remediated 20 TPH soil. The internal dryer temperature is a maximum of about 600° F. so the outlet hot aggregate 23 is in the 310°-330° F. range, say 320° F. It may be stockpiled as at 36, but is preferably transferred to the batch tower 10, along with the hot R.A.P. 14 having a temperature in the range of from about 100° F. to about 180° F. out of the condenser/heat exchanger unit 12.

The exhaust gas 24 out of the main dryer 21 will have a temperature on the order of 300° F. Fly ash (fines) therein are collected in a baghouse 25 and the flue gas passes out stack 26 at a temperature in the range of from about 250° to about 275° F. with less than 0.5%S. The baghouse fly ash 29 may be pneumatically transferred to batch tower 10, and is typically about 1% of the total aggregate throughput of main dryer 21.

The batch tower 10 is typically a 350 TPH tower which, by use of screens, segregates the aggregates into four compartments. The aggregates are introduced into the mixing chamber via a weighing hopper. Dust 29 from the baghouse 25, and hot oil 18 is added, mixed for 30-40 seconds and loaded into a truck.

The small amount of water 37 (2.5-2.6 gpm) from the o/w separator 27 is transferred to the asphalt plant water treatment facility for treatment, use and/or discharge in a conventional manner.

EXAMPLE 1

The system equipment described above (30' × 6' dia. separator) was employed to remediate a standard process aggregate (sand and spiked with 25,000 ppm #2 diesel fuel. The separator was operated at 600° F. at a 40 TPH throughput while rotating at 4.5 rpm. The residence time was 8 minutes. After processing in one pass, the remediated aggregate was tested for HC by the EPA modified 8015 Test with the results being that HC's were non-detectable. The contaminated feed moisture varied. Flue gas into the condenser unit was 240° F., condenser outlet gas was 140° F., with O/W condensate out of the condenser being 125° at approximately 2 gpm.

EXAMPLE 2

The same equipment system as in Example 1 was used operating at 5.5 rpm. The contaminated soil contained waste oil products assaying 10,000 ppm and moisture content was variable. After 1 pass at 700° F. at a throughput of 18 TPH with a 12 min. residence time, the EPA 8015 Test showed total HC as non-detectable. The condenser inlet gases were 240° F., outlet gases 140° F., and liquid condensate was 125° F. at about 2 gpm.

DISCUSSION

Knocking down the HC in both #2 diesel and waste oil from 25,000 ppm to below 10 ppm, and indeed to non-detectable levels, in 1 pass with a short residence time was totally unexpected and shows the process is sound and equipment operates beyond expectation. The energy efficiency, especially the improvement of 5-10% in the main dryer unit, was also an unexpected bonus.

CONDENSER UNIT

FIGS. 2-4 illustrate the condenser/heat exchanger unit 12 of this invention having special compressed air, pulsed, mud-clearing blow tubes to keep the hot flue gas chambers free of accumulated fines which would, if left unchecked, plug the hot flue gas zones and passages, thereby reducing the efficiency and unit life, and in some cases rendering the unit effectively inoperative.

Condenser 12 comprises a large generally through-shaped bin, typically a 20-ton bin, 14 feet wide, 22 feet long and 16 feet high, having 32—6" R.A.P. bins or feed zones, which is supported in a framework 50 (shown only in apart in order to not obscure the essential parts) which includes a plurality of legs 51, 52, 53 and associated supporting struts (not numbered). A bin of the type shown in Bracegirdle 4,784,216, but extensively modified as described here, is the preferred best mode unit.

The bin comprises a pair of planar, generally vertical, spacedapart end walls 54, 55, but it should be understood that the end walls can be inclined inwardly to provide more of a funnel shape. The side walls are provided in spaced pairs 56, 57 and 58, 59 to form inlet plenum 60 and outlet plenum 61 therebetween, respectively. The sidewall pairs are spaced apart and canted inwardly as shown to provide a generally trough-shaped bin. Disposed across the bin, transverse to its longitudinal axis, and spanning the space between the sidewalls are a plurality of pairs of divider plates which form therebetween hot flue gas heat exchange zones 62-68. These wall pairs are spaced apart along the longitudinal axis of the bin to provide bins 70-75 for receiving the R.A.P. 13 as shown therein. Both the tops and bottoms, of the side plenums 60 and 61 are sealed, with plates 76, 77 being the top plates, and 78, 79 being the bottom plates. The bottom plates 78, 79 generally extend inwardly to form a slanted bottom 78a, 79a of the trough (best seen in FIG. 3). These plates do not meet in the middle, but are spaced apart sufficiently to provide housing for a double (twin) counter-rotating mixing-/feed screw unit 117, 118 which deposits the heated R.A.P. to the batch tower 10 (not shown in FIG. 2).

The tops of the heat exchanger hot gas zones 62-68 are covered by plates 81-87. The pairs of heat exchanger plates 62a, b through 68a, b extend downwardly and are sealed at their bottom ends, either by the bottom plates 78a, 79a, or by individual bottom plates 101-107 to provide a hot air plenums. However, the interior sidewalls 57, 59 are slotted to provide passages into these plenums to permit access into and exit therefrom of the hot separator flue gas 11a containing the volatile hydrocarbons. The hot gas enters through duct 88, passes through plenum 60, then horizontally through zones 62-68 in a cross-flow direction to the vertically downward motion of the R.A.P. 13 in the R.A.P. bins 70-75. The cooled exhaust gases are collected in the exhaust plenum 61 and exhausted out duct 89 as cooled flue gases 19, which are then ducted alternately to the burner 20 of the main dryer 24 as secondary air, or a portion thereof to the burner 3 of the separator 2. In the process of flowing through condenser unit 12, the flue gases lose heat and the R.A.P. is heated. One or more drain pipes 90, 91 remove the oil/water condensate 15.

Compressed air reservoir 92 is fed compressed air at about 125 psig via line 93 from an air compressor (not shown). This reservoir 92 feeds a plurality of heavy-duty feed hoses 94-100 (1 ½-2" dia), via a plurality of solenoid actuated diaphragm valves as best shown in FIG. 3, and thence into internal manifolds (headers 110-116) which feed blow tubes (130a-g, 131a-g, 132a-g, etc.), best shown in FIG. 4. Only three of the feed hoses 94-96 are shown in FIG. 2 in order to not obscure the drawing. Each feed hose has its own solenoid and diaphragm valve. Only one is shown in FIG. 3 in order to not obscure the drawing.

It should be understood that while six R.A.P. bins 70-75 are shown with seven heat exchanger zones 62-68, any desired numbers may be employed. Typically, the R.A.P. bins are 6 inches wide and the inner width of the flue gas heat exchange plenums 62-68 is 1 ½ inches.

Turning now to FIG. 3, this is a schematic end elevation view taken along lines 3—3 in FIG. 2 with the facing (left as seen in FIG. 2) vertical heat exchanger zone plate 67a being removed to reveal therein a plurality of blow tubes 130a-130g. Only blow tubes 130a-c are shown in order to not obscure the entire drawing. The blow tubes are generally inclined downwardly from inlet toward the outlet at 3 degrees ±2 degrees to assist in permitting condensate runoff. As noted, the hot separator flue gases 11a are inlet via duct 88 in the right side plenum 60. While this is shown at the bottom in order to not be confused with the blow-down compressed air system (described in more detail below), in the preferred embodiment, the hot gases inlet is in the upper right at the back end (as seen in FIG. 2), and the exhaust of cooled gases 19 via plenum 61 and duct 89 is at the upper left of the front end, as shown in FIG. 2.

The flue gases are distributed in the plenum 60, and then pass cross-flow to the downward flowing R.A.P. 13, as best shown by the wiggly arrows in the center of FIG. 3. Condensate 15 is taken out via one or more pipes 90, 91 at the bottom. While those pipes are shown at the bottom of the plenums 60 and 61, it should be understood that they may be located at any convenient place in the bottom panel 78a, 79a. As the R.A.P. flows downwardly, it is collected and distributed onto the conveyor belt assembly 80 by the twin screws 117, 118 which are separated by the internal baffle 119. This hot R.A.P. 14 is then conveyed to the batch tower 10.

On the upper right of FIG. 3 shown bracket 120 which is secured to the sidwall of the bin or the framework assembly 50. The compressed air reservoir 92 with its inlet 93 is secured to the bracket 120. In turn, secured to the reservoir by bracket 126 is a series of solenoid valves 123 which actuate the diaphragm valve 121; the two valves are inter-connected by air line 122. As shown in FIG. 3, only one of these series of assemblies are shown, 121f, 122f, 123f and 126f, as each feeds a single flexible heavy duty steam-type feed hose 99 to one of the plurality of interior manifolds 110-116. Manifold 115 is shown connected to the hose 99. This manifold 115 is a tube approximately 2" × 4" square in cross-section and approximately 93" long; it is aligned generally vertically (as seen in side elevation) and inclined parallel to the inner wall 57 of the R.A.P. bin 75. It functions as an interior manifold header for a plurality of copper tubes 140a–140g which distribute the compressed air from the air reservoir via feed hoses to the blow tubes 130a–130g. These are connected by nipples 150a–g and 160a–g, one at each end. This is best seen in FIG. 4.

The blow tubes are typically 5/8ths wide by 1 ½ inch high and are sealed at each end. The upper (right hand) end providing the inlet from the copper pipe. These blow tubes are placed approximately 6 inches on center vertically, one above the other. A plurality of 1/64th inch holes are drilled in the bottom in a slanted fashion to provide a longated openings 135 as best seen in FIG. 4. These holes are typically spaced 8 inches on centers. Each of the solenoid valves is electrically connected via wiring 124 to a pulse controller 125.

Commencing with FIG. 3 and following on to FIG. 4, the operation of the blow down control is as follows: During the processing of the contaminated soil being remediated in separator 2, a large quantity of ultra fine material, typically on the order of below about 300 mesh is produced. While the knockout box 34 generally will remove above 300 mesh material and some portion of the below 300 mesh material, a quantity of it is transported via the flue gases 11a into the condenser unit. There, as the water and HCs are condensed, the ultra fine dust combines with the condensate to produce a heavy mud which can build up quickly in the flue gas heat exchange zones 62–68, thereby reducing the efficiency and eventually plugging the unit to the point of inoperativeness. In order to keep the heat exchange zones clear, the blow pipes are inserted in the gaps 62–68 in the inclined orientation as shown in FIGS. 3 and 4. The controller 125 randomly causes the solenoid valves 123 to actuate their associated diaphragm valve to release a pulse on the order of 1 ½ to 5 seconds in duration, preferably 2 ½ seconds in duration, via the high pressure hoses 94–100 into their associated interior manifolds 110–116, and then into their associated blow pipes 130ag. As shown in FIGS. 3 and 4, the compressed air 136 blows clean th adjacent wall area, and the dust is carried out with the exhaust gases 19 and thence to the main dryer where it is combined with the hot aggregate 23. The interval between pulses is on the order of 10 sec. to 3 minutes, preferably 20–40 seconds, so that every internal manifold 110–116 and its associated blow tubes is pulses on the average every 3–25 minutes, preferably 5–10 minutes. All of the blow tubes in a single heat exchange zone are pulsed simultaneously.

An additional function of the blow tubes is that they maintain the spacing of the walls 62a, b through 68a, b from each other to maintain the integrity of the heat exchange zones 62–68. This is essential because the weight of the R.A.P. could cause these walls to collapse inwardly, thus reducing air flow through the heat exchanger and reducing its efficiency. These blow pipes thus supply a dual function of spacers and dust clearance. FIG. 4 only shows seven blow pipes inserted in zone 66, and it should be understood that any desired number may be employed. Likewise, zone 67 only shows three tubes and zone 68 two blow tubes, simply to not obscure the drawing. While only seven heat exchange zones 62–68 are shown, it is understood that for a 20-ton bin, from 31–33 would be employed.

It should be understood that various modifications within the scope of this invention can be made by one of ordinary skill in the art without departing from the spirit thereof. It should be understood that where reference is made to R.A.P. heated through b in 12, aggregate may be employed in place of or admixed with R.A.P. I therefore wish my invention to be defined by the scope of the appended claims as broadly as the prior art will permit in view of the specification.

I claim:

1. Process for remediation of soil containing up to about 30,000 ppm hydrocarbon contaminants comprising the steps in any operative sequence of:
   (a) providing hydrocarbon-contaminated soil in a divided condition of minus 1 ½" to a first confined zone where it is exposed to an open flame;
   (b) heating while agitating said contaminated soil in an oxidizing atmosphere in said first zone to a temperature below soil ignition within a range of from about 375° F. to about 750° F. for a time sufficient to drive off as vapors a substantial percentage of said hydrocarbon contaminates from said soil;
   (c) passing hot gases containing said hydrocarbon vapors from said first zone to a second zone;
   (d) recovering heat from said hot gases in said second zone to condense a substantial percentage of said hydrocarbon vapors as liquid hydrocarbons;
   (e) recovering said liquid hydrocarbons; and
   (f) removing said soil from said first zone as remediated soil having below about 1000 ppm hydrocarbon contaminants.

2. Soil remediation process as in claim 1 which includes the steps of:
   (a) removing said contaminated soil from a site remote from said first zone; and
   (b) transporting said soil to said first zone for remediation processing.

3. Soil remediation process as in claim 2 which includes the step of:
   (a) returning at least some of said remediated soil to said original site.

4. Soil remediation process as in claim 1 which includes the steps of:
   (a) assaying the residual hydrocarbon content of said remediated soil; and
   (b) providing at least a portion of said remediated soil having less than about 1000 (ppm residual hydrocarbon content and meeting D.O.T. minimum standards as asphalt aggregate filler.

5. Soil remediation process as in claim 1 which includes the steps of:
   (a) assaying the residual hydrocarbon content of said remediated soil; and
   (b) providing at least a portion of said remediated soil having less than about 100 ppm residual hydrocarbon content and not meeting D.O.T. minimum roadbase standards as clean remediated soil for return to an original or other site.

6. Soil remediation process as in claim 1 which includes the steps of:
   (a) recovering said hot gases after condensation of liquid hydrocarbon therefrom; and
   (b) providing said hot gasses as secondary air to a burner.

7. Soil remediation process as in claim 6 which includes the steps of:
   (a) providing said recovered heat to R.A.P.; and
   (b) providing said liquid hydrocarbon as a feed into hot oil for asphalt production.

8. Soil remediation process as in claim 6 which includes the steps of:

(a) heating cold aggregate in a burner-fired main dryer, and (b) at least a portion of said hot gases are provided to said main dryer burner.

9. Soil remediation process as in claim 8 which includes the steps of:

(a) assaying the residual hydrocarbon content of said remediated soil; and (b) providing at least a portion of said remediated soil having less than about 1000 ppm residual hydrocarbon content meeting D.O.T. minimum standards as asphalt aggregate filler.

10. Soil remediation process as in claim 8 which includes the steps of:

(a) assaying the residual hydrocarbon content of said remediated soil; and (b) providing at least a portion of said remediated soil having less than about 100 (ppm residual hydrocarbon content and not meeting D.O.T. minimum roadbase standards as clean remediated soil for return to an original or other site.

11. Soil remediation system comprising in operative combination:

(a) first means for heating hydrocarbon contaminated soil in a confined zone to produce hydrocarbon vapors as a component of hot gases;

(b) said first heating means comprises an inclined cylinder having a contaminated soil inlet disposed adjacent a first, upper end thereof, a remediated soil outlet disposed adjacent a second, lower end thereof, an axial burner disposed adjacent said lower end, and a dust and fines knockout box having a gases inlet from said first, upper end, said axial burner being disposed to provide flame exposure to said soil being passed therethrough;

(c) means for recovering heat from said hot gases and condensing from said hot gases hydrocarbon vapors therein as liquid hydrocarbons leaving residual cooled gases;

(d) means for recovering said liquid hydrocarbons condensed from said hot gases; and (e) means for recovering remediated soil from said heating means.

12. Soil remediation system as in claim 11 which includes:

(a) means for recovering said residual cooled gases and providing at least a portion thereof as secondary air to a burner.

13. Soil remediation system as in claim 12 which includes:

(a) means for providing said recovered liquid hydrocarbons as a feed in asphalt manufacturing operations.

14. Soil remediation system as in claim 13 which includes:

(a) a main aggregate dryer having a burner; and (b) means for mixing hot aggregate from said main aggregate dryer and said recovered liquid hydrocarbons to form asphalt.

15. Soil remediation system as in claim 14 wherein:

(a) said heat recovery means is adapted to transfer said heat recovered to R.A.P. to produce heated R.A.P.

16. Soil remediation system as in claim 15 which includes:

(a) means for providing at least a portion of said remediated soil to said main aggregate dryer.

17. Apparatus for condensation of hydrocarbons and water from hot flue gases exiting a soil hydrocarbon remediation separator unit while heating Recycled Asphalt Products, comprising in operative combination:

(a) a trough shaped bin having a longitudinal axis and a plurality of Recycled Asphalt Products heating zones disposed generally perpendicular to said axis, an upper cold Recycled Asphalt Products inlet and a lower heated Recycled Asphalt Products outlet;

(b) hot flue gases heat exchange plenums disposed to form opposed, spaced boundaries of said Recycled Asphalt Products zones generally transverse to said longitudinal axis;

(c) hot gases inlet and outlet plenums communicating with said heat exchange plenums;

(d) means for outlet of collected condensate from said bin;

(e) means for supply of compressed air to said bin;

(f) means for distributing compressed air into said heat exchange plenums to clear dust and mud collected therein during condensation while cooling said hot flue gases.

18. Soil remediation condensation/heat exchange bin as in claim 17 wherein:

(a) said compressed air distribution means comprises:

(i) a plurality of headers, each of which is associated with a heat exchange plenum;

(ii) a plurality of blow tubes disposed in each heat exchange plenum; and (iii) piping connecting each of said headers to a set of blow tubes in a common heat exchange plenum.

19. Soil remediation condensation/heat exchange bin as in claim 18 wherein:

(i) a plurality of valves, each associated with one of said headers; and (ii) means for actuating said valves to cause a pulse of compressed air to pass to said blow tubes to clear dust and mud from said heat exchange plenums.

20. Soil remediation condensation/heat exchange bin as in claim 19 wherein:

(a) said blow tubes are generally rectangular in cross-section and include a plurality of spaced holes providing compressed air jets to clear internal walls area of said heat exchange plenums.

* * * * *